(12) United States Patent
Montalban

(10) Patent No.: US 11,422,385 B2
(45) Date of Patent: Aug. 23, 2022

(54) PROCESS FOR MOUNTING AN ELASTIC HINGE ON EYEGLASS FRAMES

(71) Applicant: VISOTTICA INDUSTRIE S.p.A., Susegana (IT)

(72) Inventor: Rinaldo Montalban, Venice (IT)

(73) Assignee: VISOTTICA INDUSTRIE S.P.A., Susegana (IT)

( * ) Notice: Subject to any disclaimer, the term of this patent is extended or adjusted under 35 U.S.C. 154(b) by 377 days.

(21) Appl. No.: 16/675,440

(22) Filed: Nov. 6, 2019

(65) Prior Publication Data

US 2020/0073142 A1    Mar. 5, 2020

Related U.S. Application Data

(63) Continuation of application No. 15/347,809, filed on Nov. 10, 2016, now abandoned.

(30) Foreign Application Priority Data

Nov. 12, 2015  (IT) .................. 102015000071852

(51) Int. Cl.
*G02C 5/22* (2006.01)
*B29C 65/56* (2006.01)
(Continued)

(52) U.S. Cl.
CPC ............ *G02C 5/2236* (2013.01); *B29C 65/56* (2013.01); *E05D 3/022* (2013.01); *E05F 1/1041* (2013.01);
(Continued)

(58) Field of Classification Search
CPC ............... Y10T 29/24; Y10T 29/49947; Y10T 29/29959; Y10T 29/49963; G02C 5/2236;
(Continued)

(56) References Cited

U.S. PATENT DOCUMENTS 618,118  A      1/1899  Moews
3,941,461 A  *  3/1976  Lambert .................. G02C 1/08
                                                     351/95
(Continued)

FOREIGN PATENT DOCUMENTS

CN    1477421    2/2004
CN    1289941    12/2006
(Continued)

OTHER PUBLICATIONS

"Drawbore Pins" Lee Valley catalog, http://www.leevalley.com/us/html/15k0101ie.pdf. Last modified Jun. 8, 2016 (year 2016).

*Primary Examiner* — Sarang Afzali
(74) *Attorney, Agent, or Firm* — Mark M. Friedman

(57) ABSTRACT

A process for mounting an elastic hinge on eyeglass frames, for coupling a first pivot element, which comprises an elastic carriage provided with a head portion having a first hole, with a second pivot element comprising two shoulders provided with second holes. The head portion of the first pivot element comprises a tilted slide surface adjacent to the first hole. The process envisages to insert the head portion in a slit between the shoulders of the second pivot element to place in succession their holes offset from each other, and then engaging a hinge pin in the holes, so that the free end of the hinge pin acts in abutment against the slide surface of the head portion, in order to force the carriage to slide until the first hole of the first pivot element is aligned with the second holes of the second pivot element.

5 Claims, 9 Drawing Sheets

(51) Int. Cl.
*E05D 3/02* (2006.01)
*E05F 1/10* (2006.01)

(52) U.S. Cl.
CPC ..... *G02C 2200/24* (2013.01); *G02C 2200/26* (2013.01); *Y10T 29/49959* (2015.01)

(58) Field of Classification Search
CPC .. G02C 5/2209; G02C 5/2218; G02C 5/2227; G02C 5/2245; G02C 5/2254
See application file for complete search history.

(56) References Cited

U.S. PATENT DOCUMENTS

| | | | |
|---|---|---|---|
| 4,145,124 A * | 3/1979 | Weisgerber | G02C 5/2281 16/228 |
| 4,222,148 A | 9/1980 | Zellweger et al. | |
| 5,255,838 A * | 10/1993 | Gladdish, Jr. | A61F 2/38 228/125 |
| 6,353,965 B1 * | 3/2002 | Lo | G02C 5/2236 16/228 |
| 8,684,518 B2 * | 4/2014 | Gasparetto | G02C 5/2236 351/153 |
| 2002/0092960 A1 | 7/2002 | Hotellier | |
| 2004/0207806 A1 | 10/2004 | Kerjean | |
| 2006/0233623 A1 * | 10/2006 | Andoh | B23G 1/32 409/66 |
| 2008/0192199 A1 | 8/2008 | Hotellier | |
| 2008/0266518 A1 * | 10/2008 | Niu | G02C 5/2236 351/153 |
| 2011/0185538 A1 | 8/2011 | Hotellier et al. | |
| 2012/0026452 A1 | 2/2012 | Alain | |
| 2016/0377883 A1 | 12/2016 | Montalban | |

FOREIGN PATENT DOCUMENTS

| | | |
|---|---|---|
| CN | 202677000 | 1/2013 |
| CN | 202854428 | 4/2013 |
| CN | 104487885 | 4/2015 |
| EP | 0384289 | 8/1990 |
| FR | 2658570 | 8/1991 |
| IT | UD20070224 | 5/2009 |
| WO | 2004040355 | 5/2004 |
| WO | 2006053983 | 5/2006 |
| WO | 2014/142326 | 9/2014 |

* cited by examiner

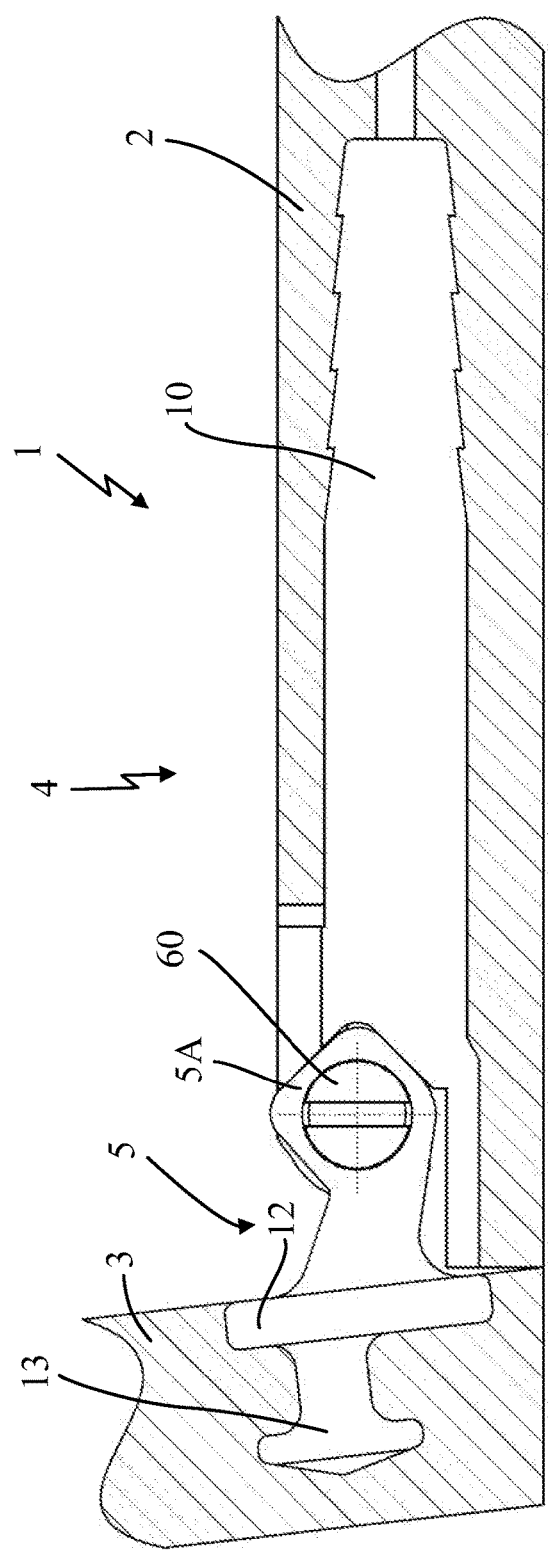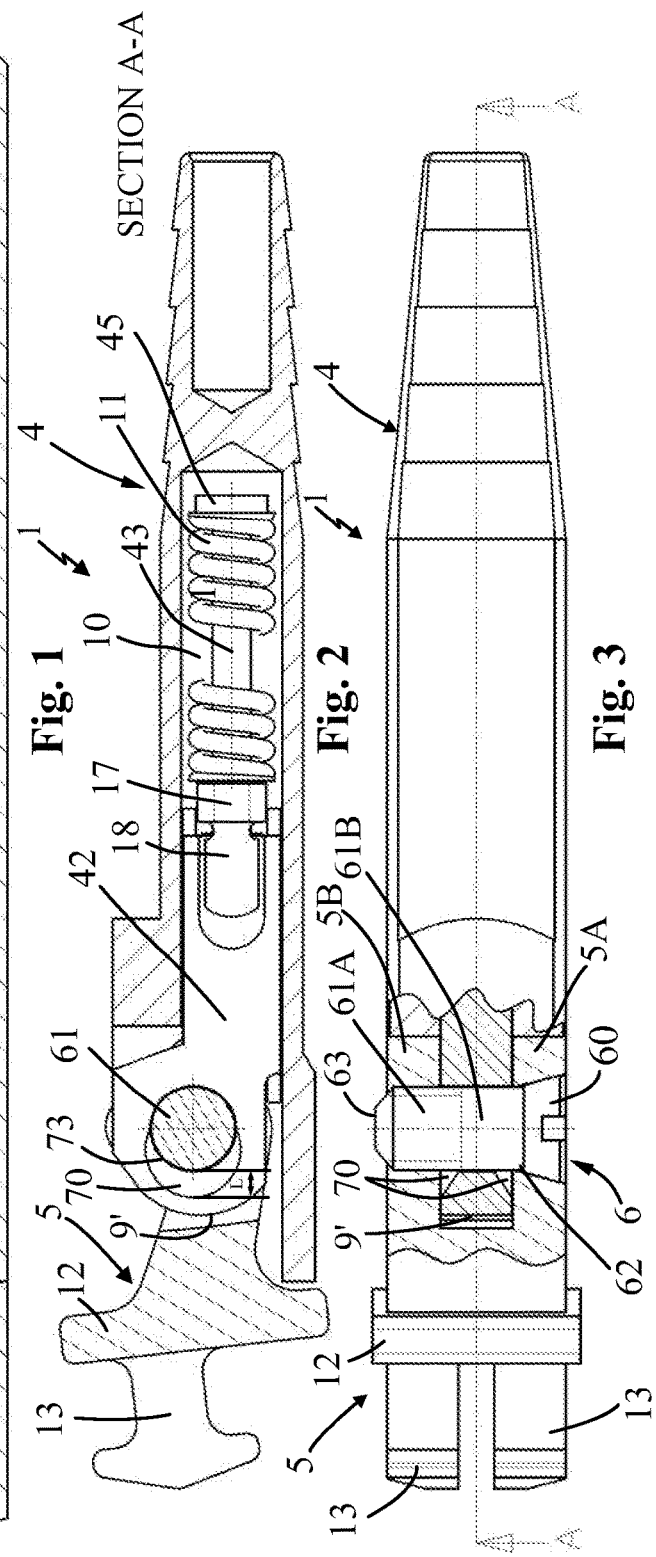

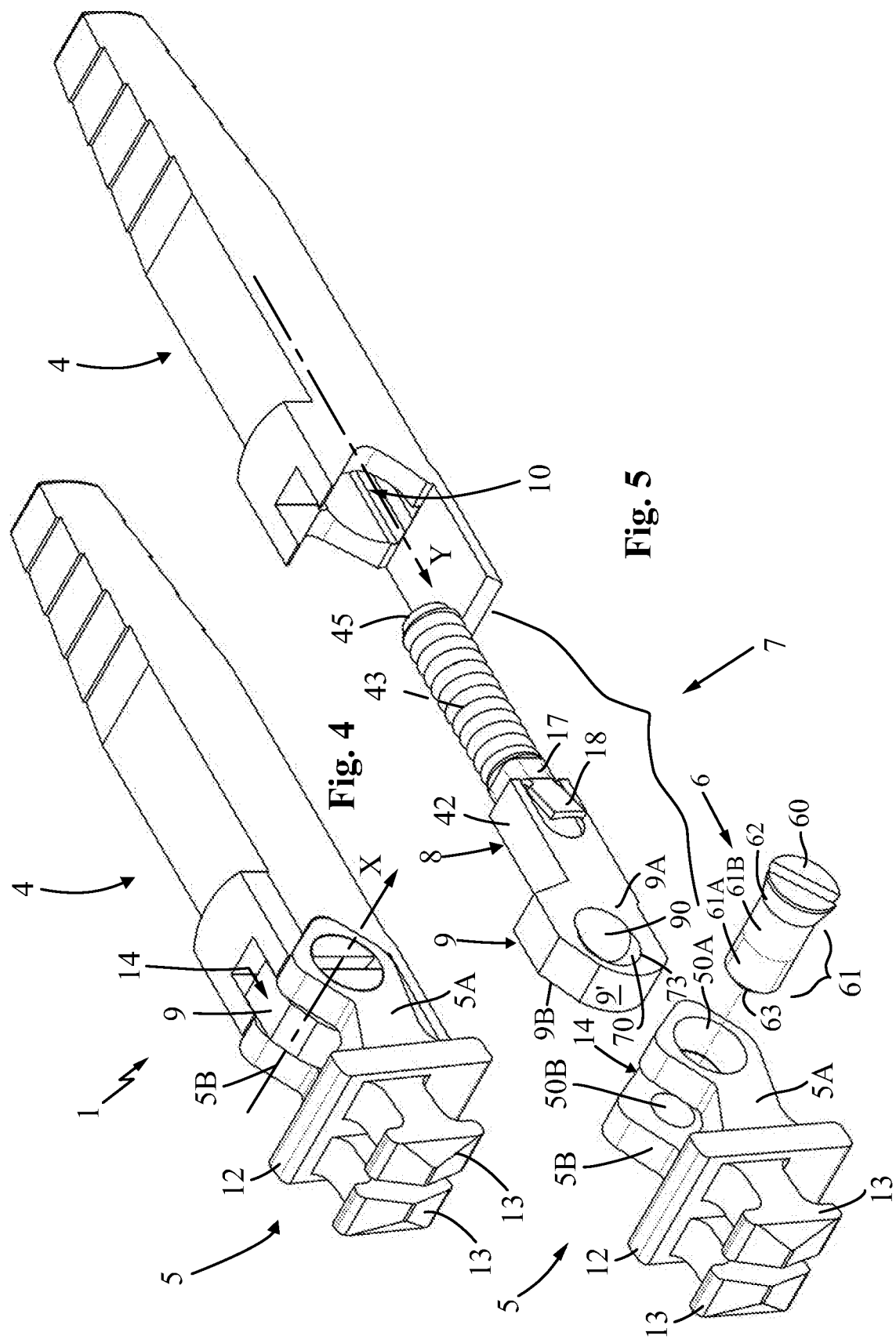

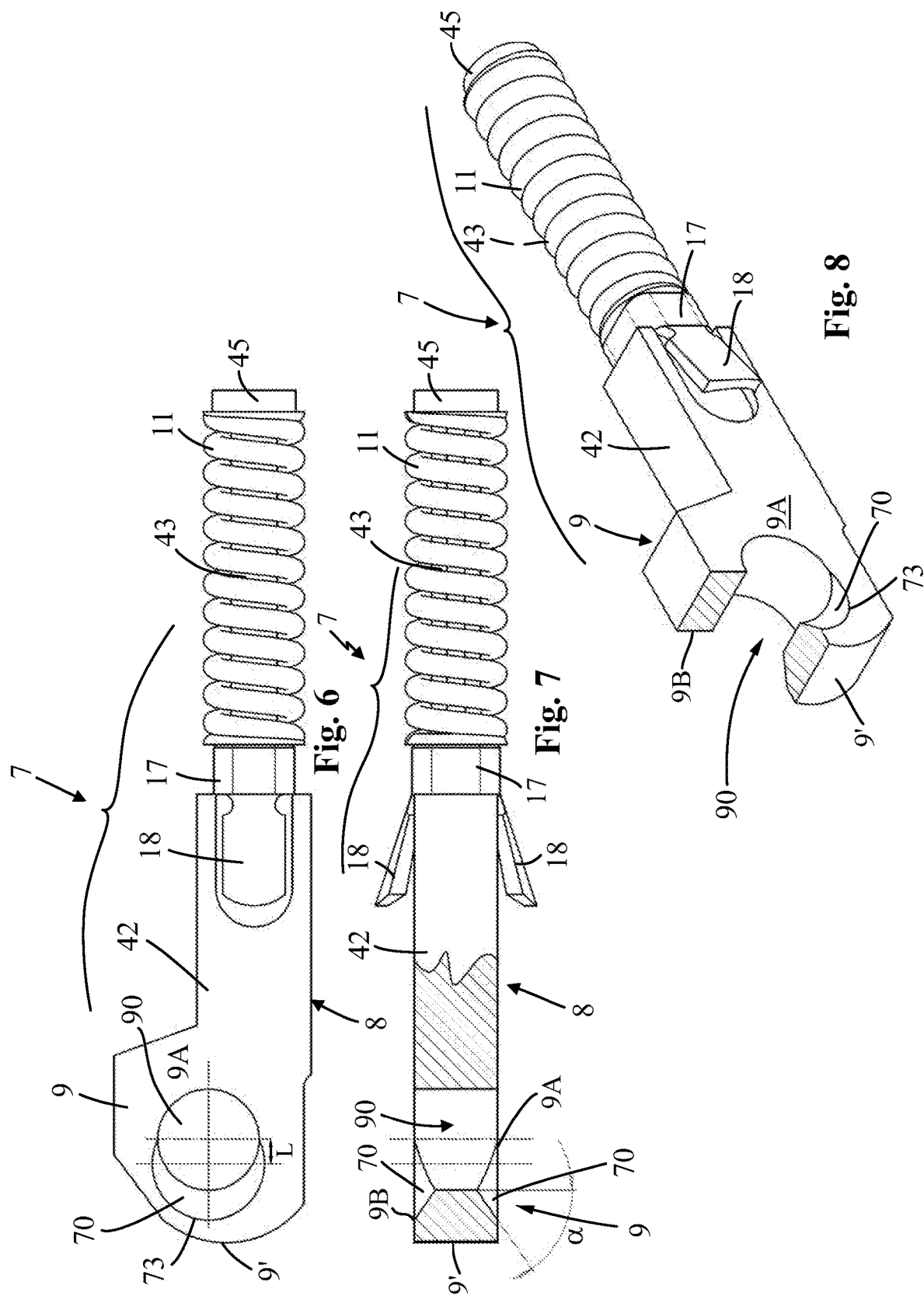

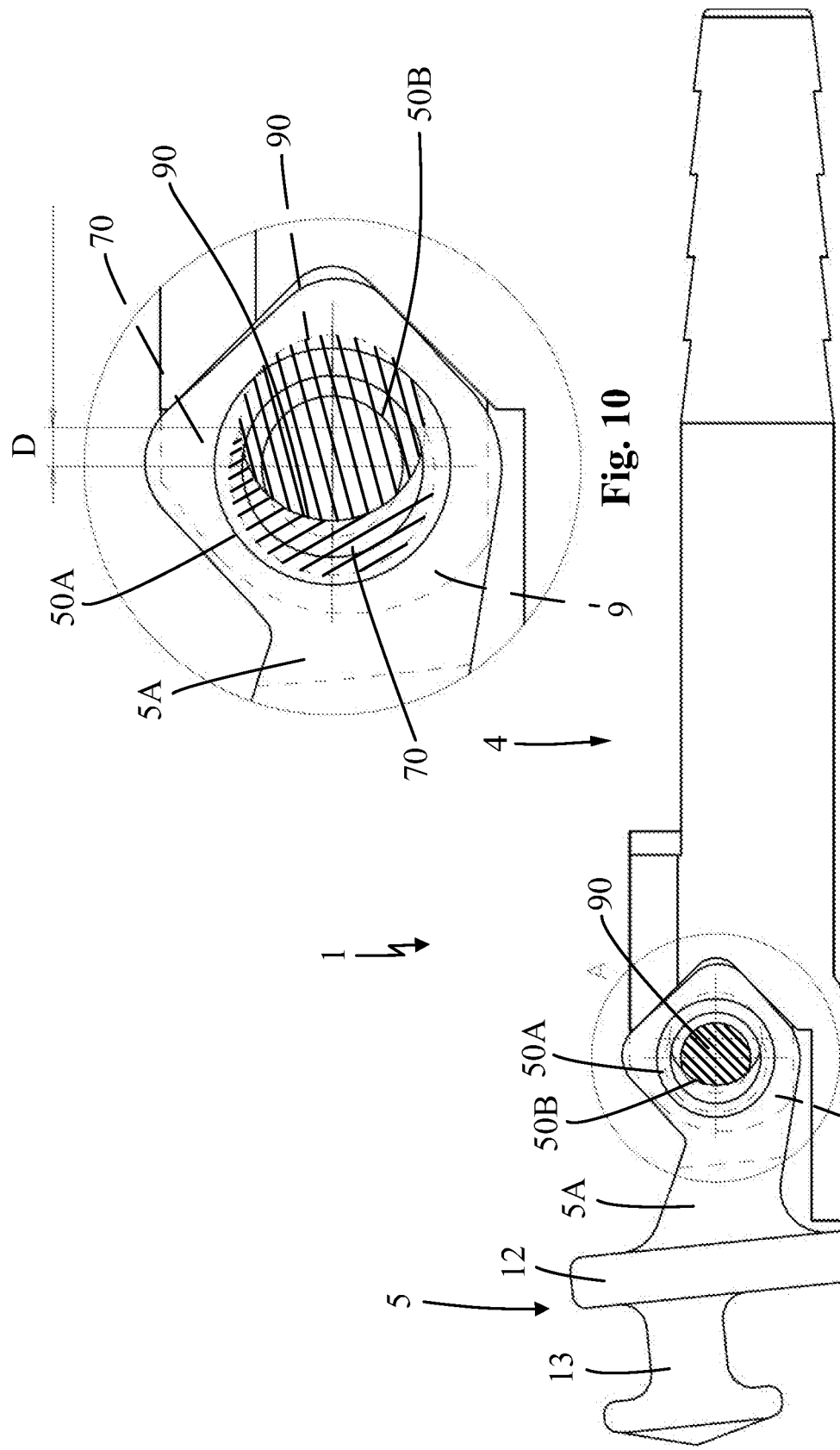

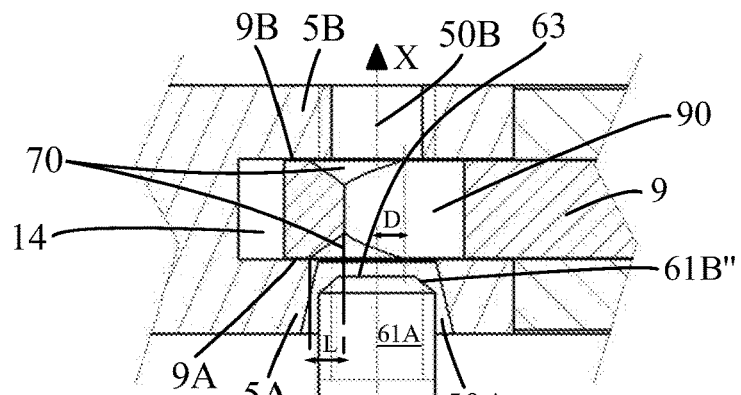
Fig. 11A
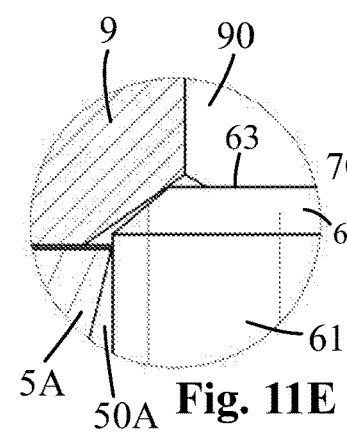
Fig. 11E
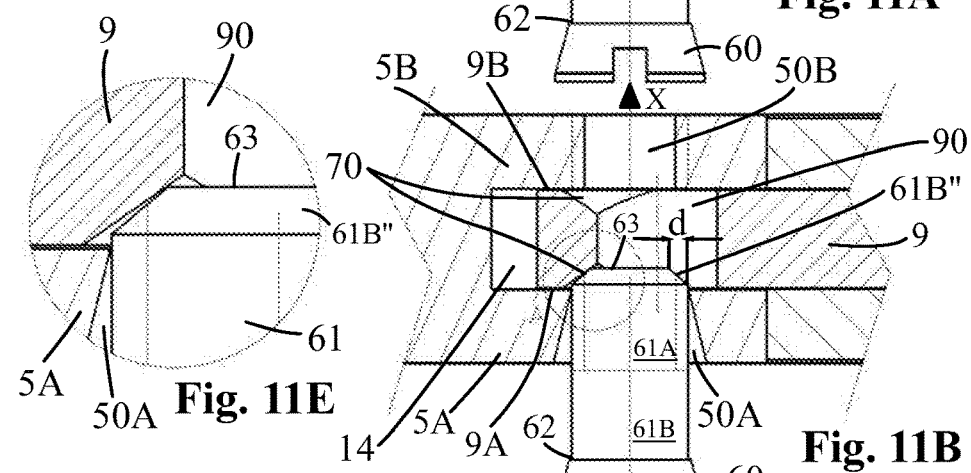
Fig. 11B
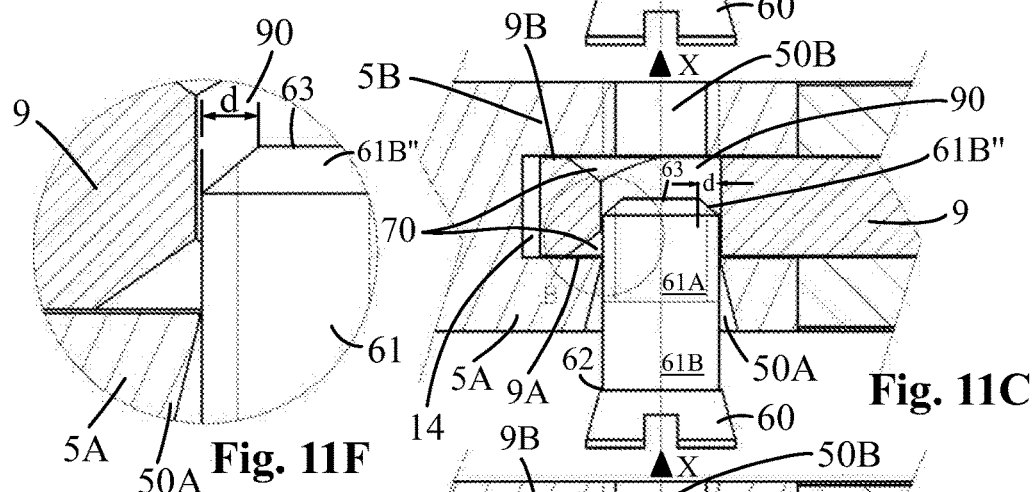
Fig. 11F · Fig. 11C
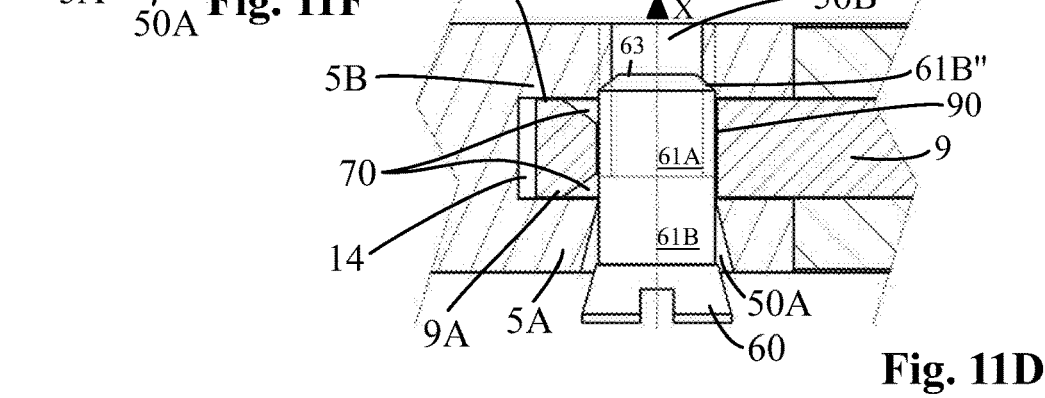
Fig. 11D

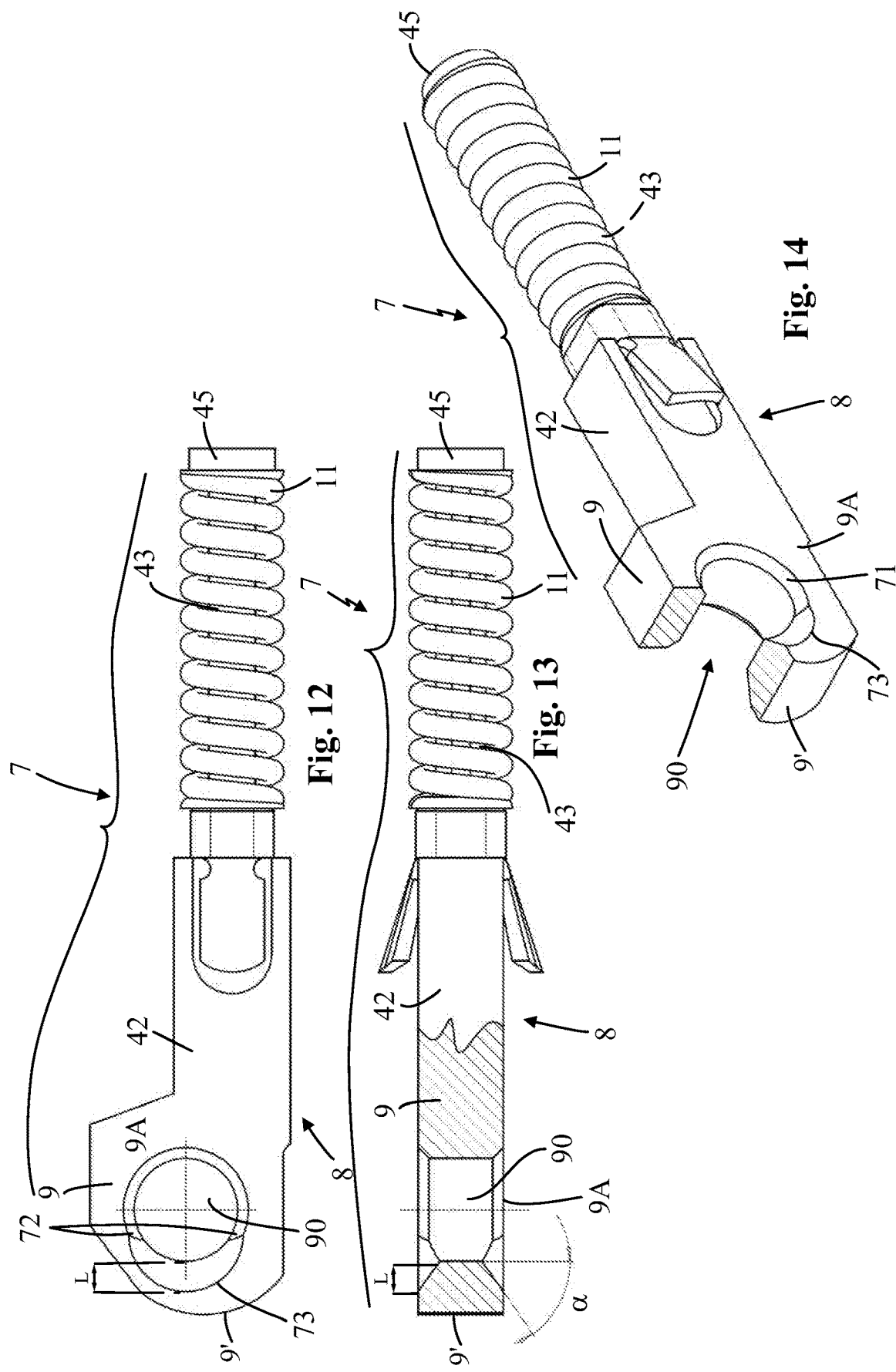

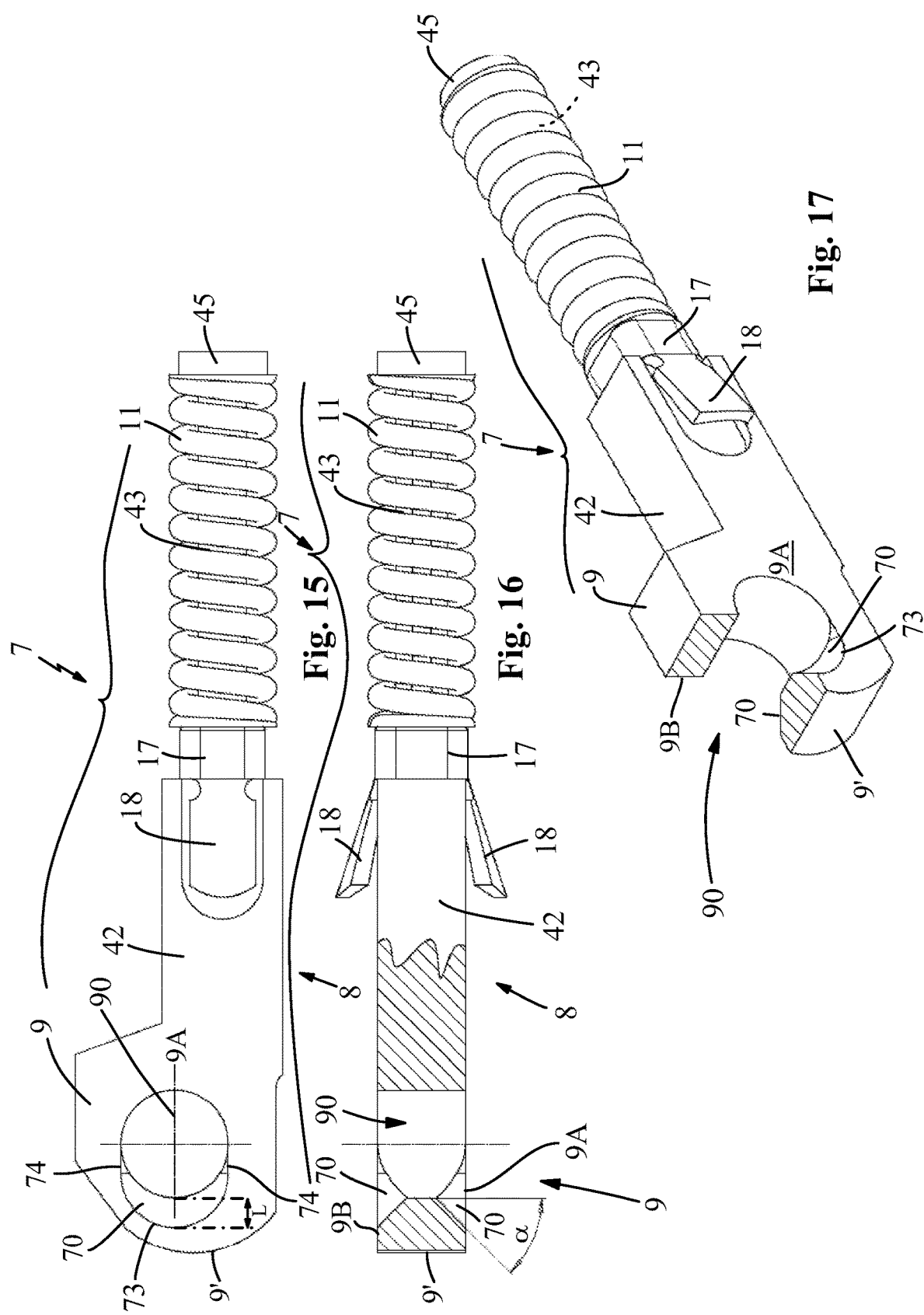

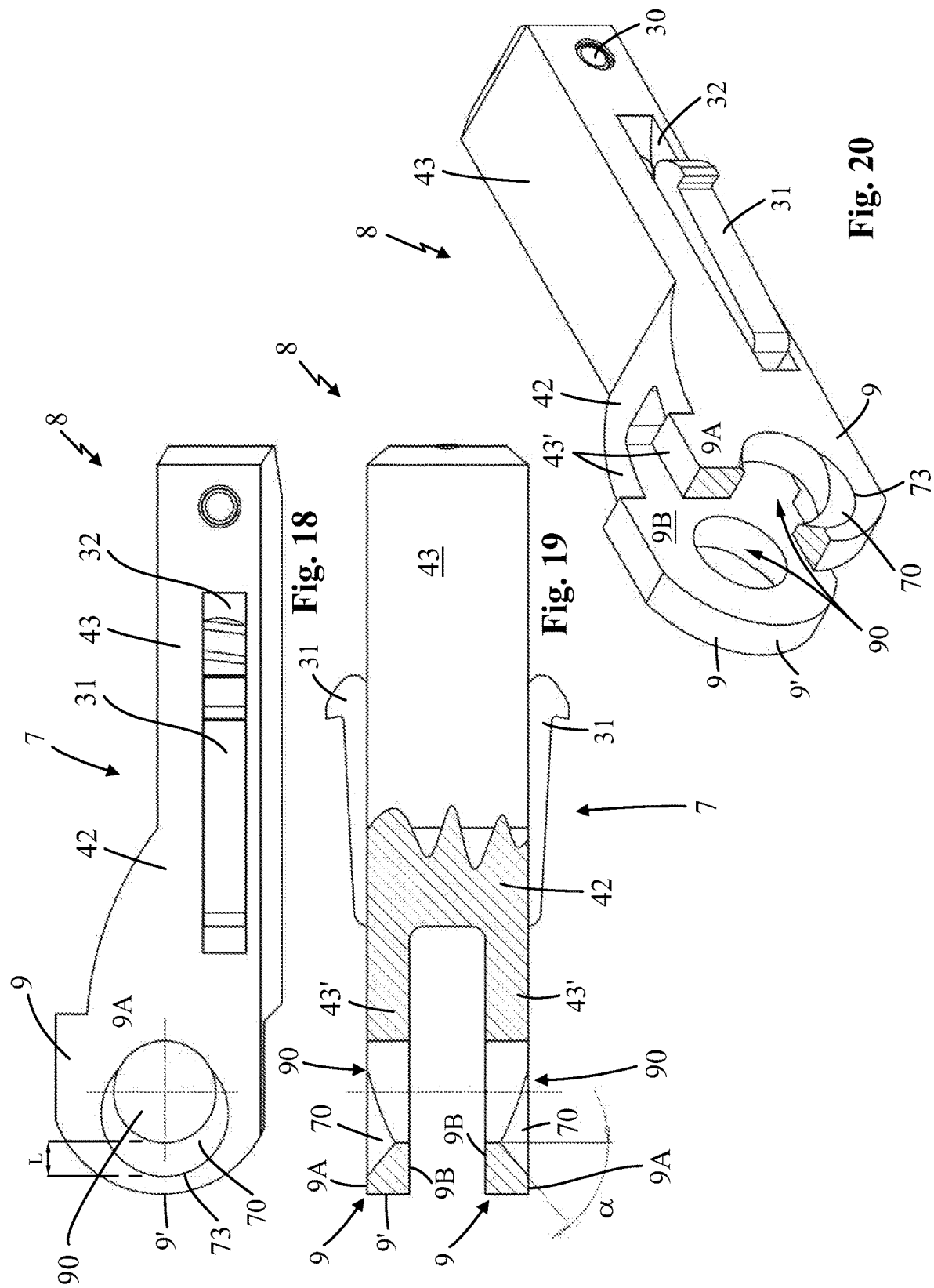

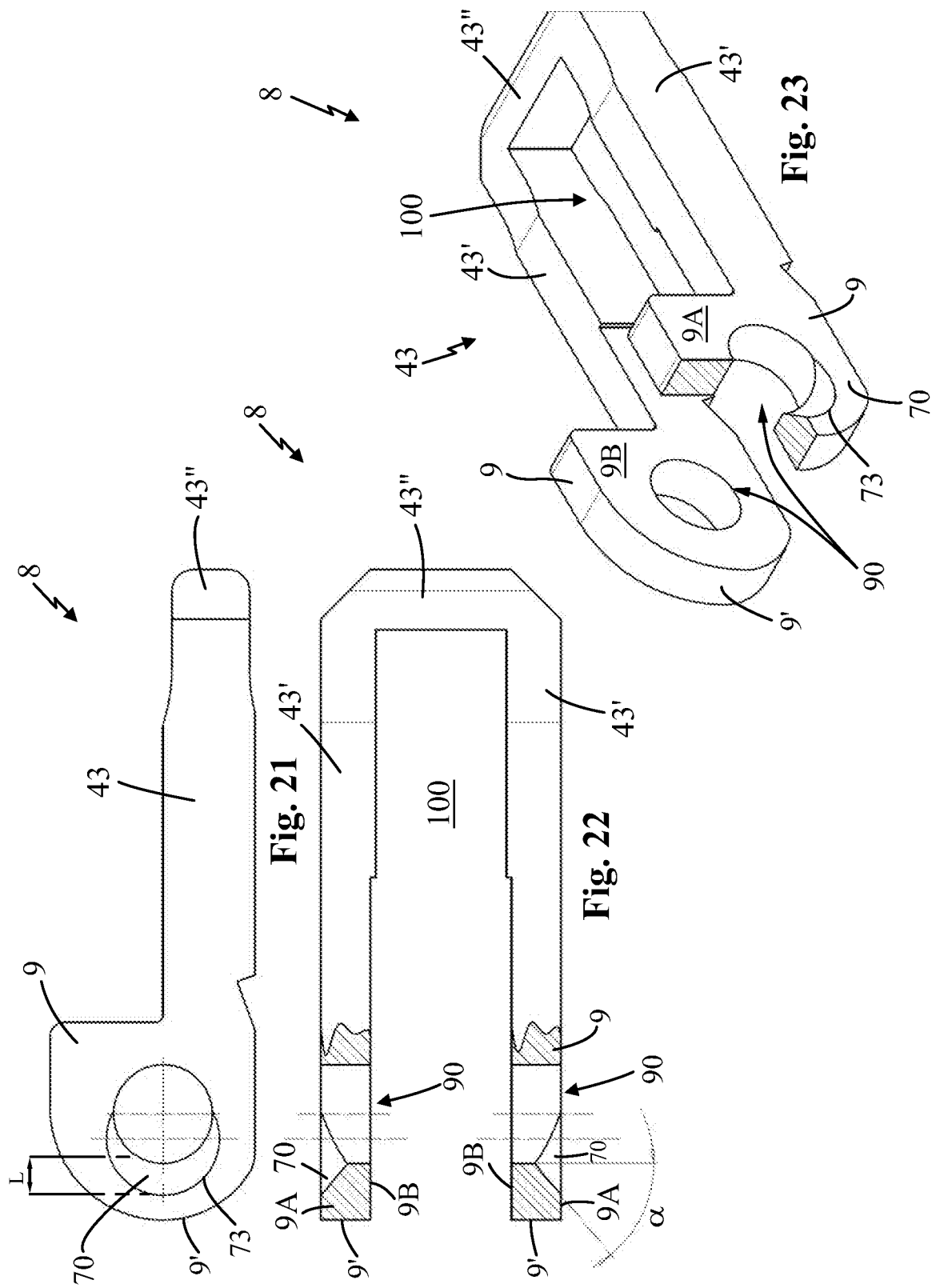

PROCESS FOR MOUNTING AN ELASTIC HINGE ON EYEGLASS FRAMES

FIELD OF APPLICATION

The present invention regards an elastic hinge for eyeglass frames and a process for mounting a hinge on eyeglass frames.

The present elastic hinge is intended to be advantageously employed in the production of eyeglass frames, made of plastic or metal, in particular of the type provided with two pivots coupled to each other by means of a pin which must overcome an elastic pre-compression force associated with a pivot.

Therefore, the hinge, object of the present invention, is inserted in the industrial field of eyeglasses or production of eyeglasses and accessories and components for eyeglasses.

STATE OF THE ART

Conventionally, in the field of eyeglasses, hinges are employed in order to join the temples to the front of a frame.

Each hinge is usually formed by two pivot elements, pivoted to each other, of which, respectively, a first element is fixed to a temple and a second element is fixed to a lateral portion of the front of the frame (also known, in the technical jargon of the field, with the term "end piece").

In operation, the hinges allow the temples to rotate between a closed position, in which they are collected on the front of the eyeglasses, and an open position, in which they assume a substantially right-angle position with respect to the front adapted to allow the use thereof on the face of the user.

In particular, the present invention refers to so-called "elastic" hinges, i.e. to hinges that allow moving the temples between the aforesaid positions by overcoming a contrast force exerted by an elastic device associated with the hinge.

The elastic device allows numerous advantages, including that of allowing the user to more easily put on the eyeglasses, since the temples can be moved for an extra-travel beyond the aforesaid open position in order to then be released, once the eyeglasses are put on, on the head of the user thus exerting a light pressure thereon. Such pressure allows the temples to always be maintained adherent to the head of the user, ensuring an optimal stability of the eyeglasses in the different use conditions.

The elastic device also allows maintaining the temples collected behind the front in a stable closure condition.

The elastic device associated with the first pivot element usually comprises one or more elastic mechanisms, usually constituted by flex carriages.

Each carriage is housed inside a corresponding elongated seat, fixed to the temple along its longitudinal extension axis.

The seat is made directly on the temple or it is made on a box-like body borne thereon.

Each carriage is susceptible of sliding along the longitudinal axis of the seat and is elastically returned towards the interior of the seat itself by at least one spring.

The first pivot elements associated with the elastic mechanisms are pivoted by means of a hinge pin to the second pivot elements fixed to the end piece. For such purpose, the pin is engaged in aligned holes of the two pivot elements.

In order to exert this suitable pressure on the temples of the user, it is necessary for the spring of the elastic device to be suitably pre-compressed already during carriage assembly. In addition, it is almost always necessary for the spring of the elastic device to be further subjected to an additional preloading that is provided by giving a certain offset between the holes of the two pivot elements during mounting, before inserting the pin.

This offset between the holes of the first pivot element associated with the temple and provided with the elastic mechanism, and the holes of the second pivot element associated with the end piece and substantially fixed, is recovered in assembly step during the mounting of the hinge screw. Indeed, with the insertion of the screw, the elastic mechanism is forced for a section which allows aligning the holes of the two pivot elements with each other, actually obtaining the further preloading of the elastic device.

In practice, the elastic hinges of known type have demonstrated the drawback of requiring a process of assembly of the two pivot elements that is rather problematic, due in fact to the aforesaid offset of the holes between the two pivot elements which can be complex to recover for the insertion of the screw, since it requires that the optician or the automatic machines, in case of automated screwing, achieve a complex centering operation before being able to insert the screw. Regardless of the difficulty of the aforesaid operation, the process in any case involves a centering step that negatively affects the production process or further complicates work of the optician.

This problem is still more significant if there are elastic hinges with pivots having five or more wings, in which there are multiple wings that must be aligned with each other.

In order to overcome this drawback, it is known to use self-centering screws, as described for example in the patent FR-A-2658570. In accordance with such known elastic hinge, the screw comprises, following a threaded stem portion, also a non-threaded extension portion.

This extension portion advantageously has reduced diameter compared to the diameter of the threaded portion and fulfils the object of facilitating the centering of the two pivot elements and consequently the assembly of the elastic hinge. After the screw has been mounted, its extension portion is easily broken or removed, actually reducing the self-centering screw to a conventional screw.

The hinges of known type which employ self-centering screws, as described above, have the disadvantage that once the extension portion of the screw is broken—such portion serving to facilitate the centering of the hinge—the same screw becomes a conventional screw and thus in case of disassembly and subsequent remounting of the hinge there is once again the problem of centering the holes.

A further drawback of these known hinges lies in the fact that the extension portion of the stem of the screw is material that is lost, with a consequent increase of the production costs.

Another drawback of the hinges with self-centering screw lies in the fact that they cannot be applied to frames that provide for concealing the hole of the relative hinge pivot placed at the end of the stem of the screw.

Indeed, for aesthetic reasons the hole can be concealed by an extension portion of the temple or it can be concealed by attaining the hole blind, such that the latter tab of the pivot appears externally clean without interruption.

In both cases, it is not possible to use this type of self-centering screws since the extension portion could not project from the hole.

More in detail, presently it is sought to obtain aesthetics as "clean" as possible on the frames, consequently, visible components such as hinges, or parts thereof such as screws or holes are increasingly considered unaesthetic elements for the eyeglasses line.

It is therefore sought to reduce this problem by integrating these elements inside the eyeglass frame or in any case by seeking to hide them from sight.

As already partly mentioned above, it is known to remedy these aesthetic problems by means of the use of hinges which provide for covering the upper tab of the pivot where the hole of the screw leads to a portion of the temple, as for example described in the patent WO-A-2006053983.

Otherwise, some hinges diffused on the market provide for making such hole (usually of the second female pivot fixed to the end piece) of non-through but blind type, so as to obtain the hidden screw effect.

Otherwise, furthermore, the screw and its hole can be hidden by suitable projecting walls of the seat, as described for example in the patent WO-A-2004040355.

Nevertheless, of course, the aforesaid hinge solutions which do not make use of self-centering screws have the abovementioned problem relative to the insertion of the screw, due to the fact that with such operation it is also necessary to attain a further loading of the elastic device.

In order to overcome the screw mounting difficulties and simultaneously meet the aforesaid aesthetic needs, the patent IT-A-UD2007000224 provides for connecting the two pivots with a screw, the carriage being disengaged from the temple, and then only at a later time inserting the carriage in the containment structure with the desired loading of the elastic device by employing a second screw for locking the carriage in the desired load position of the spring. The second screw is however a third element, with respect to the frame, which remains visible and which is necessary for locking the carriages with the desired preload.

Therefore, the current elastic hinges present on the market have the drawback of not simultaneously meeting the aesthetic needs of concealing the components of the hinge and the function needs of tightening the spring of the elastic device during the coupling of the pivots with the right load that allows a return of the temples with the correct pressure on the user's head.

PRESENTATION OF THE INVENTION

In this situation, the problem underlying the present invention is to eliminate the drawbacks of the abovementioned prior art, by providing an elastic hinge for eyeglass frames which is easy to mount.

A further object of the present finding is to provide an elastic hinge for eyeglass frames that have entirely satisfactory aesthetics.

A further object of the present finding is to provide an elastic hinge for eyeglass frames which allows concealing from view the hole of the hinge pivots for the screw insertion.

A further object of the present finding is to provide an elastic hinge for eyeglass frames that are entirely reliable in operation.

A further object of the present finding is to provide a process for mounting a hinge for eyeglass frames which is quick and easy to achieve.

A further object of the present finding is to provide a process for mounting a hinge for eyeglass frames which can be executed in a simple manner, even following disassembly of the hinge after its assembly during eyeglass production, by an optician or the same user.

A further object of the present finding is to provide a process for mounting a hinge for eyeglass frames which is inexpensive to achieve.

These and still other objects are all achieved by the elastic hinge for eyeglass frames, object of the present invention, which comprises: a first pivot element, mechanically associable with a first component of the eyeglass frame, provided with an elastic device, susceptible of housing in a seat associated with the first component and comprising: at least one carriage slidably movable in the seat, and provided at an external end thereof with at least one head portion, projecting from the seat and provided with a corresponding first hole which is extended passing between two lateral faces of the head portion; at least one spring acting on the carriage in order to elastically force it towards the interior of the seat; a second pivot element, mechanically associable with a second component of the eyeglass frame and comprising at least two shoulders provided with second holes and delimiting at least one slit between them, in which the head portion is inserted; at least one hinge pin engaged in the first hole and in the second holes of the first and second pivots in order to rotatably couple them together.

According to the idea underlying the present invention, the elastic hinge for eyeglass frames is characterized in that the head portion comprises at least one slide surface, which is extended towards the external end of the head portion on at least one lateral face of the head portion directed towards the head of the hinge pin, covering at least one area adjacent to the first through hole and extended in a tilted manner towards the first through hole.

BRIEF DESCRIPTION OF THE DRAWINGS

The technical characteristics of the finding, according to the aforesaid objects, and the advantages thereof will be more evident from the following detailed description, made with reference to the enclosed drawings, which represent several merely exemplifying and non-limiting embodiments of the invention, in which:

FIG. 1 shows an elastic hinge for eyeglass frames in accordance with a first embodiment of the present invention, which is mounted to connect a temple and an end piece of the eyeglass frame, and is illustrated with the temple in open position and in a top view; the temple and the end piece only illustrated in a portion thereof in proximity to the hinge as well as drawn in section in order to better illustrate the same hinge;

FIG. 2 shows the hinge of FIG. 1 in the same top view, represented in longitudinal section, and without illustrating the eyeglass frame;

FIG. 3 shows the hinge of FIG. 1 in a side view, depicting in section only the portion at the provided hinge pin and without illustrating the eyeglass frame;

FIG. 4 shows the hinge of FIG. 1 in a perspective view;

FIG. 5 shows the hinge of FIG. 1 in a perspective view disassembled from the frame with the component partially in exploded view;

FIG. 6 shows a detail of the hinge of preceding figures relative to an elastic carriage represented in a side view;

FIG. 7 shows the elastic carriage of FIG. 6 in a top view with only the portion at the hinge pin depicted in section;

FIG. 8 shows the elastic carriage of FIG. 6 in a perspective view, with a portion of the eyelet at the hinge pin depicted in section;

FIG. 9 shows a top view of the hinge in accordance with the present invention, the hinge pin having been removed, with hatched lines indicating the hole of a first male pivot connected to the temple and a dashed line indicating the minimum area inscribable in the offset between the two holes of the two pivot elements;

FIG. 10 shows an enlarged view of a portion of the hinge of FIG. 9 at the holes of the two pivots, with different hatch lines indicating two details of the present invention relative to the first hole of the head portion of a carriage, and to a slide surface adjacent to such first hole;

FIGS. 11A, 11B, 11C and 11D show the hinge in accordance with the present invention, in a sequence of operations during the mounting of the hinge pin;

FIGS. 11E and 11F show two enlarged details respectively of FIGS. 11B and 11C;

FIG. 12 shows a detail of an elastic hinge for eyeglass frames in accordance with a second embodiment of the present invention, relative to an elastic carriage represented in a side view;

FIG. 13 shows the elastic carriage of FIG. 12 in a top view with only the portion at the hinge pin depicted in section;

FIG. 14 shows the elastic carriage of FIG. 12 in a perspective view, with a portion of the eyelet at the hinge pin depicted in section;

FIG. 15 shows a detail of an elastic hinge for eyeglass frames in accordance with a third embodiment of the present invention, relative to an elastic carriage represented in a side view;

FIG. 16 shows the elastic carriage of FIG. 15 in a top view with only the portion at the hinge pin depicted in section;

FIG. 17 shows the elastic carriage of FIG. 15 in a perspective view with an eyelet portion at the hinge pin depicted in section;

FIG. 18 shows a detail of an elastic hinge for eyeglass frames in accordance with a fourth embodiment of the present invention, relative to an elastic carriage represented in a side view;

FIG. 19 shows the elastic carriage of FIG. 18 in a top view with only the portion at the hinge pin depicted in section;

FIG. 20 shows the elastic carriage of FIG. 18 in a perspective view with an eyelet portion at the hinge pin depicted in section;

FIG. 21 shows a detail of an elastic hinge for eyeglass frames in accordance with a fifth embodiment of the present invention, relative to a male element of an elastic carriage represented in a side view;

FIG. 22 shows the elastic carriage of FIG. 21 in a top view with only the portion at the hinge pin depicted in section;

FIG. 23 shows the elastic carriage of FIG. 21 in a perspective view with an eyelet portion at the hinge pin depicted in section.

DETAILED DESCRIPTION OF A PREFERRED EMBODIMENT

With reference to the enclosed drawings, reference number 1 overall indicates the elastic hinge for eyeglass frames, object of the present invention.

The elastic hinge 1, according to the present invention, is intended for making eyeglass frames of both conventional and sports type and is adapted to mutually join together, in a per se known manner, a temple 2 and an end piece 3 of a frame for eyeglasses.

The latter will be obtained in a manner that is per se entirely conventional and hence for example made of plastic material, such as nylon, or other plastic materials suitable for such purpose, or metal material. The frame will be described hereinbelow only in summary, since its constructive principles are well known to a man skilled in the art.

More in detail, the frame is usually formed, in a per se conventional manner, by a front that supports a pair of lenses, connected in the central part by a bridge, and by a pair of temples 2 pivoted by means of elastic hinges 1 to the sides of the front and, more precisely, to two lateral portions thereof directed towards the rear part of the eyeglasses and known in the technical jargon with the term end pieces 3.

In particular, the hinge 1 according to the present invention is of elasticized type, i.e. adapted to allow an extra-travel in the opening of the temples 2, with elastic return aimed to allow easily putting on the eyeglasses and aimed to ensure an improved fit thereof once put on the head of the user.

In operation, the temples 2 can be moved, due to the aforesaid elastic hinges 1, in a manner that is per se entirely conventional, between a closure position, in which they are collected on the front of the eyeglasses, an open position, in which they assume a substantially right angle position with respect to the front of the eyeglasses, and an extra-travel position, in which they are forced beyond the aforesaid open position.

The elastic hinge 1 comprises two pivot elements 4, 5 mechanically associated with each other by means of a hinge pin 6.

More in detail, a first pivot element 4 represents the male of the hinge and is mechanically associable with a first component of the eyeglass frame represented, in accordance with the embodiments of the enclosed figures, by a temple 2 of the frame; the second pivot element 5, i.e. the female element of the hinge, is in turn mechanically associable with a second component of the eyeglass frame which is represented by the end piece 3 of the front of the eyeglasses in accordance with the embodiments of the enclosed figures.

Of course, without departing from the protective scope of the present invention, the first pivot element 4 can otherwise be associated with the end piece 3 while the second pivot element 5 will be correspondingly associated with the temple 2.

The first pivot element 4 comprises an elastic device 7, which is housed in a seat 10 preferably associated in accordance with the embodiments of the enclosed figures, with the temple 2 of the frame also because its elongated form makes it more suitable to receive the seat 10 rather than associate it with the end piece 3 of the frame, usually of reduced longitudinal extension.

The seat 10 can be obtained with a box-like body fixed to the temple 2, or it can be made inside the temple 2 directly during the manufacturing thereof.

The seat 10 is therefore preferably extended in an elongated manner along a longitudinal axis Y parallel to the axis of the temple 2.

More in detail, the elastic device 7 comprises a carriage 8, slidably movable inside the seat 10, and provided at its end outside the seat 10, with at least one head portion 9, at least partially projecting outside the seat 10.

Such head portion 9 is provided with a corresponding first hole 90 which is extended in a manner passing between two lateral faces 9A, 9B of the same head portion 9.

The elastic device 7 then comprises a spring 11 acting elastically on the carriage 8 in order to force it towards the interior of the seat 10.

In turn, the second pivot element 5 comprises at least two shoulders 5A, 5B provided with corresponding second through holes 50A and 50B axially aligned with each other.

The two shoulders 5A, 5B delimit a slit 14 between them, in which the head portion 9 of the first pivot element 4 is inserted.

The first and the second pivot element 4 and 5 are then mutually pivoted to each other by means of the abovementioned hinge pin 6, inserted in the first hole 90 and in the second holes 50A, 50B mentioned above with transverse axis X.

Such hinge pin 6 is advantageously constituted by a screw.

More in detail, the hinge pin 6 comprises advantageously a head 60 and a stem 61 provided with a first end 62, connected to the head 60, and with a second free end 63 opposite the first end 62 connected to the head 60. The stem 61 is preferably provided with a threaded portion 61A placed adjacent to the free end 63 and with a middle portion 61B positioned in continuation of the threaded portion 61A towards the head 60.

More in detail, advantageously, a first shoulder 5A of the two shoulders 5A, 5B of the second pivot element 5 is provided with a second shaped through hole 50A with a cavity in which the head 60 of the pin 6 fits, while the second shoulder 5B is provided with a second threaded hole 50B in which the threaded portion 61A of the stem 61 of the hinge pin 6 is engaged.

In accordance with the embodiments illustrated in FIGS. 1-17, the first pivot element 4 is provided with only one elastic device 7 in turn provided with only one carriage 8 with a single head portion 9. Nevertheless, elastic devices 7 can also be provided that have with two separate carriages 8, each of which provided with a head portion 9 thereof—or elastic devices 7 can even be provided with only one carriage 8 provided with two head portions 9 that are mechanically joined together.

More in detail, each carriage 8 of the first pivot element 4 is provided with a main longitudinal extension along the longitudinal slide axis Y parallel to that of the temple 2 and is composed of a neck portion 42 and with a rod-like portion 43 and aforesaid one or two head portions 9.

In accordance with this preferred embodiment, the neck portion 42 is extended to the rear from the head portion 9 along the longitudinal extension axis Y and is shaped with an advantageously prismatic shape, e.g. parallelepiped in order to prevent the rotation of the carriage around its longitudinal extension axis inside the seat 10 suitably shaped in its initial guide section with respect to the aforesaid neck portion 42.

The rod-like portion 43 is extended starting from the rear face of the neck portion 42 and has, at the free end, an enlarged head 45 constituted for example by the head of a screw or of a pin or by a riveting of the end of the rod-like portion 43.

The abovementioned spring 11 that aims to push the carriage 8 towards the interior of the containment structure 10 is advantageously coaxially wound around the rod-like portion 43 and abuts with its ends on one side against the enlarged head 45 of the rod-like portion 43, and on the other side against the end stop obtained for example with step or ring or another element internally projecting from the seat 10 (e.g. produced by means of punching) in order to interfere with the spring 11.

Advantageously, the aforesaid end stop is obtained with a locking element constituted by a ring 17 mounted coaxially around the rod-like portion 43 and provided with two elastic tabs 18 which—once the carriage 8 is inserted in the seat 10—are engaged inside such seat 10, defining with the ring 17 the locking of the carriage 8 in the relative seat 10', 10" with the only degree of freedom of sliding along the axis Y.

Still in accordance with the embodiments of FIGS. 1-17, the second pivot element 5 is for example obtained in a manner per se conventional, with a metal body provided with three parallel shoulders 5A, 5B, 5C, fixed to a common base 12 from which, for example, one or more feet 13 are extended that are embedded in the plastic matrix of the end piece 3 of the eyeglasses.

Otherwise, without departing from the protective scope of the present patent, the second pivot element 5 can be integrally obtained, still in a manner that is per se entirely conventional, in the plastic material of the end piece 3 with the two parallel shoulders integrally made in the plastic of the end piece 3.

Otherwise, furthermore, in case of metal eyeglasses, the second pivot element 5 can be made of a metal body welded to the end piece 3 of the frame.

In accordance with the embodiments illustrated in FIGS. 18-23, the first pivot element 4 is provided with an elastic device 7 comprising a single carriage 8 provided with two head portions 9 made at the end of two arms rigidly joined together by a common transverse portion to form a single body. The head portions 9 are provided with corresponding first through holes 90 aligned with each other.

More in detail, in the case of the embodiment of FIGS. 18-20, the transverse portion is obtained with a closed box-like body 43 (also substantially rod-like and for this reason indicated with the same reference number 43), from which the two arms 43' are extended parallel, each bearing a head portion 9 fixed to the other end. The spring is housed inside the rod-like, box-like body 43, such spring fixed at a first end thereof inside the box-like body 43 at the end thereof opposite the head portions 9, by means of a pin 30; at the second end thereof the spring abuts against a coupling element, provided with two lateral tabs 31 projecting from longitudinal slits 32 made laterally in the box-like body 43. The lateral tabs 31 terminate with a tooth susceptible of being engaged in a shoulder of the seat 10 provided in the component of the frame usually represented by a temple.

In the case however of the embodiment of FIGS. 21-23, the transverse portion is obtained with a bridge-like portion 43" which at one end joins the two arms 43', making a U-shaped element with the latter. The two arms 43' then have, at the opposite end thereof with respect to that joined by the bridge-like element 43", the two head portions 9. In this case, the spring is housed in the volume 100 delimited by the U-shaped form and comes to once again abut against a shoulder of the seat 10 provided in the component of the frame usually represented by a temple.

In the case of the two embodiments described briefly above in FIGS. 18-23, the second pivot element 5, which is not illustrated in detail since it is per se well-known to the man skilled in the art, comprises three shoulders provided with corresponding second through holes that are axially aligned with each other. Such three shoulders delimit two slits 14 between them, in which the head portions 9 of the first pivot element 4 are inserted.

Preferably between the above-considered first shoulder 5A provided with a shaped second through hole with a cavity in which the head 60 of the pin 6 fits, and the second shoulder 5B, also mentioned above, provided with a second threaded hole 50B in which the threaded portion 61A of the stem 61 of the hinge pin 6 is engaged, a third central shoulder is engaged that is provided with through hole, which receives a preferably non-threaded middle portion of the pin.

Such carriage embodiments are generally well-known to the man skilled in the art and thus will not be discussed in further detail. In accordance with the present invention, they are provided with slide surface 70 associated with the first through holes 90 of the head portions 9.

In the case of elastic device formed by two separate carriages 8, the seat 10 is advantageously composed of two corresponding slide seats, each of which slidably housing a corresponding carriage 8 at its interior.

Two springs 11 are correspondingly provided for, each of which aimed for pushing the corresponding carriage 8 towards the interior of the seat 10 and for such purpose acts against both the carriage 8 and the seat 10.

In operation, as seen in the enclosed figures and as is already per se known to a man skilled in the art, the cam profile of the shoulders 5A, 5B determines, cooperating together with the front surface of the seat 10, the open, closure and extra-open positions of the temples.

In accordance with the present invention and with all the above-presented embodiments, the elastic device 7 slidably movable along the longitudinal axis Y of the seat 10 provides that the spring 11 acts against the head portion 9 of the carriage 8, transmitting an elastic action thereto.

According to the idea underlying the present invention, the head portion 9 comprises at least one slide surface 70, which is extended towards the external end 9' of the carriage 8 on at least one lateral face 9A of the head portion 9 directed towards the head of the hinge pin 6, covering at least one area adjacent to the first through hole 90 and extended in a tilted manner towards the first through hole 90.

In operation, the slide surface 70 cooperates with the free end 63 of the stem 61 of the hinge pin 6 during its insertion in the holes 90 and 50A, 50B of the two pivots 4, 5. Due to this slide surface 70, tilted towards the first through hole 90 with average tilt angle $\alpha$ (preferably between 25° and 65°) with respect to the transverse axis X, the screw insertion force, which is expressed on the slide surface 70, advantageously breaks down into at least one component that overcomes the elastic return force of the spring 11.

Of course the tilt is directed in the sense of reducing the depth of the through hole 90, as indicated in the enclosed figures.

In this manner, the carriage 8 is forced to slide in the seat 10 until the first through hole 90 of the head portion 9 is aligned with the second through holes 50A, 50B of the shoulders 5A, 5B of the second pivot 5.

The slide surface 70 can be tilted in a constant manner according to the extension of a surface, i.e. the tilt can vary such that the slide surface 70 assumes the geometry of a circular arc, of a parabola or other similar shapes.

Advantageously, the slide surface 70 is extended on the lateral face 9A, starting from the edge of the first through hole 90, with main extension towards the external end 9', in particular according to a direction parallel to the slide direction of the carriage 8.

Preferably, the slide surface 70 is extended towards the external end 9' in an asymmetric manner with respect to the axis of the first through hole 90, and is extended in particular between a rear edge thereof, delimited by the edge of the first through hole 90, and a front edge thereof directed towards the external end 9'.

Advantageously, the rear edge of the slide surface 70 is delimited by an arc of circumference of the edge of the first through hole 90. In particular, such arc of circumference subtends an angle less than or equal to 180°.

The slide surface 70 is extended in the direction of the external end 9' of the head portion 9 for a depth L equal to or greater than the offset D which is present between the hinge pin 6 and the through hole 90 when the two pivots 4 and 5 are engaged but the pin 6 is removed. In this manner, the edge of the free end 63 of the hinge pin 6 will interfere with the slide surface 70, forcing the head portion 9 of the carriage 8 to translate towards the exterior of the seat 10.

The free end 63 of the hinge pin 6 is advantageously connected to the stem 61 by means of a terminal portion 61B" with tapered shape and in particular with frustoconical shape so as to make a further opening for inserting the pin 6. In this case, it will suffice that the slide surface 70 be extended in the direction of the external end 9' of the head portion 9 for a depth L at least equal to the difference between the aforesaid offset D and the depth "d" of the terminal portion 61B" with tapered shape.

Such depth L is preferably extended for at least $\frac{1}{5}$ of the diameter of the through hole 90 so as to make a sufficient additional preloading at the spring 11.

Advantageously in accordance with the embodiment of FIGS. 12, 13 and 14, in order to eliminate the burrs of the punching machining of the through hole 90, the latter has at least at the lateral face 9A of the head portion 9 directed towards the head 60 of the hinge pin 6, and preferably on both lateral faces 9A, 9B of the head portion 9, a smoothed annular edge 71 which is extended for at least one circular sector and is connected at its ends 72 to the slide surface 70.

Preferably, the front edge of said slide surface 70 towards the external end 9' is extended with circular arc form 73. Such circular arc 73 has diameter substantially equal to that of the first hole 90 and is tangentially connected thereto with two parallel sections 74.

Otherwise, such circular arc 73 has diameter greater than that of the first hole 90 and encloses the latter, being connected thereto in middle position or in an advanced position beyond the middle position in the direction of the seat 10.

In the abovementioned case in which the carriage 8 of the first pivot element 4 is provided with two parallel head portions 9 that are provided with two corresponding first holes 90, then the slide surface 70 will be extended at least from the external lateral face 9A directed towards the head 60 of the hinge pin 6. Preferably, two slide surfaces 70 are provided, on the two external lateral faces 9A of the two head portions 9 in order to allow a greater versatility of use of the carriage 8. As described above, in this case the two head portions 9 will be inserted in the two slits 14 defined by the three corresponding shoulders of the second pivot element 5, provided with second holes aligned with the first holes 90 of the two head portions 9.

The pin 6 can remain substantially contained in the holes of the pivots 4, 5, i.e. with the head 60 in the shaped second hole 50A of the first shoulder 5A and with the free end 63 contained inside the second hole 50B of the corresponding final shoulder (second or third, depending on the number of shoulders) of the second pivot 5. In this manner, it is possible to conceal the second hole on the external visible face of the final shoulder by extending the material of the temple with a closure portion to cover such second hole, or by making such second hole 50B blind.

Preferably, the first hole 90 of the head portion 9 lacks thread and substantially has the same diameter of the stem 61 of the hinge pin 6, compatibly with the need to allow an easy crossing thereof.

Preferably, moreover, also the second hole of the first shoulder, and the second hole of the central shoulder in case of three shoulders, lack thread and substantially have at least the same diameter of the stem 61 of the hinge pin 6.

Also forming the object of the present invention is a process for mounting a hinge on eyeglass frames 1, in particular of the above-described type; the same reference numbers will be maintained hereinbelow. Hence, for the sake of description simplicity, reference will be made to the same nomenclature introduced up to now, even if it must be intended that the same process can also be employed for mounting hinges that are different from those considered above.

The aforesaid process provides for the following operating steps.

Fixing steps are provided that are per se entirely conventional, and for this reason will not be described in detail since they are well-known to a man skilled in the art. Such steps involve fixing the first pivot element 4 to a corresponding first component of the frame (e.g. a temple 2), in a manner such that the aforesaid at least one head portion 9 is at least partially extended outside the seat 10, as well as fixing the second pivot element 5 to a corresponding second component of the frame (e.g. to the end piece 3).

A step follows in which the two pivot elements 4, 5 are brought close together, moving the temple 2 and the front 3 close to each other; then, there is a step of inserting the at least one head portion 9 in the at least one slit 14 defined by the shoulders 5A, 5B in order to place the first hole 90 and the second holes 50A, 50B in succession—even if an offset D remains between the aforesaid first hole 90 and the second holes 50A, 50B aimed to determine a further loading of the spring 11 of the elastic device 7.

According to the idea underlying the invention of the aforesaid process, a step is also provided for engaging the pin 6 within the first hole 90 and the second holes 50A, 50B of the two pivots 4, 5, during which the free end 63 of the stem 61 of the hinge pin 6 abuts against the slide surface 70 made on the lateral face 9A of the head portion 9, forcing the elastic device 7 to slide in the seat 10 until the first hole 90 of the head portion 9 of the first pivot 4 is substantially aligned with the second holes 50A, 50B of the shoulders 5A, 5B of the second pivot 5.

More in detail, advantageously during the step of engaging the hinge pin 6 in the first hole 90 and in the second holes 50A, 50B, the head 60 of the pin 6 is inserted in the shaped second hole 50A of a first shoulder 5A of the second pivot 5. Simultaneously, the threaded terminal portion 61A of the stem 61 of the pin 6 is engaged via screwing in a second threaded terminal hole 50B of the second shoulder 5B (or of the third shoulder in case of three shoulders) of the second pivot 5.

In turn, the middle portion 61B of the pin 6 is inserted in the first hole 90 of the head portion 9, in particular substantially to size.

Advantageously, the slide surface 70 is obtained by means of at least one step for removing material, in particular by means of milling with mill that conducts pass or plunge machining.

At the end of the step of engaging the pin 6, the free end 63 of the hinge pin 6 preferably remains substantially contained inside the second hole of the corresponding final (second or third) shoulder of the second pivot 5; otherwise, it exits outward slightly, as indicated in FIG. 3.

The hinge thus conceived therefore attains the pre-established objects, and in particular it is capable of allowing a facilitated possibility of assembly by realigning the holes of the two pivots. In addition, due to the present hinge, it is possible to prevent unaesthetic elements due to its visible parts and simultaneously it is susceptible of being mounted with a process that is extremely easy and inexpensive.

In any case, it is clear that modifications can be made to the elastic hinge described up to now, without departing from the scope of the invention. For example, nothing prohibits the pivot element that comprises the elastic device from being arranged on the end piece of the eyeglasses rather than on the temple.

The invention claimed is:

1. A process for mounting an elastic hinge on eyeglass frames, wherein the elastic hinge comprises:
  a first pivot element, which is mechanically associable with a first component of an eyeglass frame, and is provided with an elastic device susceptible of housing in a seat associated with said first component, said elastic device comprising:
    at least one carriage, which is slidably movable in said seat along a slide direction (Y), and is provided, at an external end of the carriage, with at least one head portion projecting from said seat and provided with a corresponding first through hole which is extended passing between two lateral faces of said head portion along a transverse axis (X) and has a circular shape;
    at least one spring, exerting an elastic force on said carriage in order to elastically force said carriage towards an interior of said seat;
  a second pivot element, mechanically associable with a second component of the eyeglass frame and comprising at least two shoulders provided with second holes and delimiting at least one slit between said at least two shoulders in which said head portion is inserted;
  a hinge pin engaged in the first through hole of the head portion of said first pivot element and in the second holes of the shoulders of said second pivot element in order to rotatably couple together said first pivot element and said second pivot element; wherein said hinge pin comprises a head, and a stem which is provided with a first end connected to the head, and with a second free end opposite the first end;
    wherein the head portion comprises at least one slide surface, which is extended towards the external end on at least one lateral face of the two lateral faces of said head portion, said lateral face directed towards the head of said hinge pin, said slide surface covering at least one area adjacent to said first through hole and extended in a tilted manner towards said first through hole;
    wherein said slide surface is extended on the lateral face, starting from said first through hole, in an asymmetric manner with respect to said transverse axis (X) of said first through hole, is extended between a rear edge, which is delimited by said first through hole, and a front edge directed towards said external end, and said slide surface is extended, between said rear edge and said front edge, along a longer main extension directed towards said external end and parallel to said slide direction (Y) of said carriage; wherein said slide surface is tilted with an average tilt angle (a) comprised between 25° and 65°, with respect to said transverse axis (X) of said first through hole;
    wherein the process comprises:
  fixing said first pivot element to said first component of the eyeglass frame, so that said elastic device is housed in the seat of said first component and said head portion is at least partially extended outside said seat;
  fixing said second pivot element to said second component of the eyeglass frame;
  inserting said head portion in said slit defined between said shoulders, in order to place in succession said first through hole with said second holes, wherein said first through hole and said second holes are offset from each other with an offset (D); wherein said slide surface is extended in direction of said external end for a length (L) orthogonal to said transverse axis (X) and equal to or greater than said offset (D);

engaging said hinge pin in the first through hole of said head portion and the second holes of said shoulders, wherein the second free end of the stem of said hinge pin acts in abutment against the slide surface of the lateral face of said head portion, wherein said hinge pin exerts an insertion force on said slide surface which breaks down said insertion force into at least one force component which overcomes the elastic force exerted by said spring on said carriage, forcing said carriage to slide in said seat, along said slide direction (Y), until the first through hole of said head portion is aligned with the second holes of the shoulders.

2. The process of claim 1, wherein said length (L) is greater than ⅕ of the diameter of said first through hole.

3. The process of claim 1, wherein the stem of said hinge pin is provided with a threaded portion placed adjacent to said second free end, and with a middle portion positioned in continuation of the threaded portion towards the head of said hinge pin, wherein said shoulders comprises a first shoulder and a second shoulder, wherein said second holes comprise a second shaped through hole provided in said first shoulder, and a second threaded hole provided in said second shoulder;

wherein, during said engaging said hinge pin in said first through hole and in said second holes, the head of said hinge pin is inserted in the second shaped through hole of said first shoulder, the threaded portion of the stem of said hinge pin is engaged via screwing in the second threaded hole of said second shoulder, and the middle portion of said hinge pin is inserted in the first through hole of said head portion.

4. The process of claim 1, wherein said slide surface is obtained by means of machining via removal of material.

5. The process of claim 4, wherein said slide surface is obtained by means of milling.

* * * * *